(12) United States Patent
Graupner et al.

(10) Patent No.: US 9,189,741 B2
(45) Date of Patent: Nov. 17, 2015

(54) AUTOMATED CONTRACT MANAGEMENT

(75) Inventors: Sven Graupner, Mountain View, CA (US); Edward S. Reynolds, Plano, TX (US); Julio Guijarro, Bristol (GB); Amitay Korn, Tefen (IL); Michael Kavanagh Smith, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 267 days.

(21) Appl. No.: 13/988,090

(22) PCT Filed: Jan. 28, 2011

(86) PCT No.: PCT/US2011/022886
§ 371 (c)(1),
(2), (4) Date: May 17, 2013

(87) PCT Pub. No.: WO2012/102728
PCT Pub. Date: Aug. 2, 2012

(65) Prior Publication Data
US 2013/0246326 A1    Sep. 19, 2013

(51) Int. Cl.
| | |
|---|---|
| *G06N 5/00* | (2006.01) |
| *G06F 1/00* | (2006.01) |
| *G06N 5/02* | (2006.01) |
| *G06Q 10/00* | (2012.01) |
| *G06F 9/455* | (2006.01) |

(52) U.S. Cl.
CPC ............ *G06N 5/025* (2013.01); *G06F 9/45508* (2013.01); *G06Q 10/00* (2013.01)

(58) Field of Classification Search
CPC .......... G06N 5/025; G06N 5/02; G06N 5/04; G06N 5/022
USPC .......................................... 709/224; 719/318
See application file for complete search history.

(56) References Cited

U.S. PATENT DOCUMENTS

| | | | |
|---|---|---|---|
| 6,487,545 B1 * | 11/2002 | Wical | 706/45 |
| 7,480,621 B1 | 1/2009 | Megiddo | |
| 2004/0085355 A1 | 5/2004 | Harmes et al. | |
| 2007/0038500 A1 * | 2/2007 | Hammitt et al. | 705/9 |
| 2007/0050393 A1 * | 3/2007 | Vogel et al. | 707/102 |

(Continued)

FOREIGN PATENT DOCUMENTS

| | | |
|---|---|---|
| JP | 2002056320 A | 2/2002 |
| JP | 2008-140411 A | 6/2008 |

OTHER PUBLICATIONS

Oldham, Nicole, et al.; "Semantic WS-Agreement Partner Selection"; University of Georgia, Athens; 2006; pp. 697-706.

(Continued)

*Primary Examiner* — Jeffrey A Gaffin
*Assistant Examiner* — Kalpana Bharadwaj
(74) *Attorney, Agent, or Firm* — Van Cott, Bagley, Cornwall & McCarthy

(57) ABSTRACT

A system for automated contract management includes a computing device (102) and a memory storing program instructions that when executed by computing device (102). The program instructions cause the computing device (102) to generate an ontology (115) of terms and cross-contractual relationships in contracts (105, 110) and machine interpretable terms (120) and cross-contractual relationships (125) derived from the contracts (105, 110) with reference to the ontology (115). A method for automated contract management is also provided.

12 Claims, 4 Drawing Sheets

(56) References Cited

U.S. PATENT DOCUMENTS

2007/0130443 A1 6/2007 Friesen et al.
2008/0270313 A1 10/2008 Cullen et al.
2009/0249290 A1 10/2009 Jenkins et al.
2009/0254506 A1 10/2009 Friesen
2009/0281853 A1 11/2009 Misvaer et al.

OTHER PUBLICATIONS

PCT; "Notification of Transmittal of the International Search Report and the Written Opinion of the International Searching Authority, or the Declaration" PCT/US2011/022886; mailed Nov. 30, 2011.

* cited by examiner

AUTOMATED CONTRACT MANAGEMENT

CROSS-REFERENCE TO RELATED APPLICATION

Pursuant to 35 U.S.C. §371, this application is the United States National Stage Application of International Patent Application No. PCT/US2011/022886, filed on 28 Jan. 2011, the contents of which are incorporated by reference as if set forth in their entirety herein.

BACKGROUND

When services or products are sourced from outside providers, business relationships must be managed with those providers. As the number and complexity of externally sourced services increases, the effort to manage the contractual business relationships with those service providers increases as well. Currently relationships of this nature are managed manually by dedicated administrative departments. In a future of pervasive cloud services and increased globalization, more business and IT functions are expected to be provided by external service providers, leading to an increased effort to manage the relationships with those service providers.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
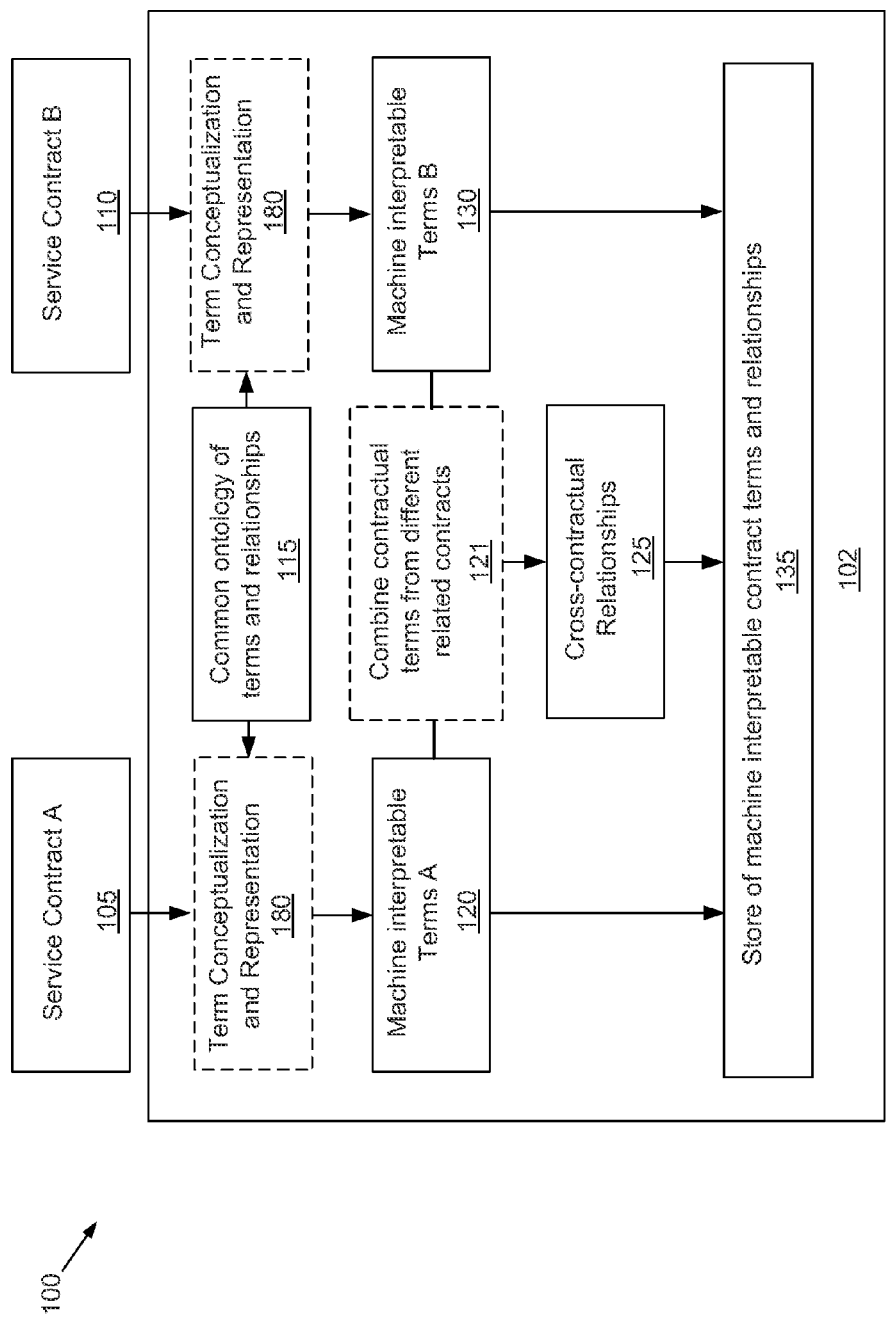
FIG. 1 is a diagram of a portion of an illustrative automated contract management system including data components related to contracts, their representation, and the data structures in which these representations are kept, according to one example of principles described herein.

Most business relationships today are maintained and managed manually. Support systems are used such as contract databases, where people can store and locate contracts. However, these support systems primarily used to manage documents. Observance of actual terms within contracts and generating actions when terms are not met or are no longer valid is not automated and consequently remains in the responsibility of people. For computer service level agreements, limited computer implementations can be used to monitor technical parameters associated with those services. For example, various computer implementations are used to monitor specific technical parameters, such as uptime, transmission rates, and computational capacity. However, these limited computer implementations are specifically programmed to monitor a particular parameter and do not have a holistic understanding of the contractual terms of the agreement between the service provider and the consumer.

For example, a service level agreement for a web site host may include a percentage of network uptime, power uptime, an amount of schedule maintenance windows, etc. The service level agreement may specify specific actions to be taken and remedies for failure to keep the agreed terms. In one implementation, a service level agreement may specify that failure by the host to maintain 99.9% uptime of a website results in a period of free hosting provided by the host. However, the consumer must notify the host of the failure to meet the uptime requirement within 30 days. Failure to comply with this notification prerequisite forfeits the client's right to receive the free hosting. An automated observance routine may monitor the uptime of the system. However, automated observance routine has no capability to analyze and take action based on the service level agreement. Consequently, human action is needed to determine if the terms of the service level agreement were fulfilled and to take appropriate action to remedy shortcomings. For example, if the host does not maintain 99.9% uptime, a human must make the determination that a term of the contract has been violated and send a timely notification to the service provider to supply the specified period of free hosting. The human then determines if the response to the notification is appropriate and the free hosting service is received. Where multiple service contracts are involved, human monitoring of each contractual term of the agreements and taking appropriate action can be burdensome and expensive.

The illustrative systems and methods described below provide automated monitoring of the contractual business terms of service level contracts and are not limited to observance of service delivery. This automated contract management system may be particularly useful in an environment where IT services are contracted from multiple external service providers. The system can detect violations, conflicts, and invalidity of the contractual terms. The system can then derive, report, and execute various action items based on the contractual terms.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The illustrative automated contract management systems and methods described below are designed to allow the automated observance of contractual terms describing a service relationship between a service provider and a consumer. The system can accommodate both formal contract models and informal service contracts. The systems allow service terms to be monitored automatically in context of complex contractual service relationships.

Flow chart illustrations and block diagrams are used to describe the illustrative automated contract management systems and methods. The blocks of the flowchart illustrations and block diagrams can be implemented by computer program instructions. These computer program instructions may be provided to a processor of a computing device to produce a machine, such that the instructions, which execute via the processor of the computing device implement the functions specified in the flowchart and block diagram blocks. The computer program instructions are stored in a computer-readable memory. The memory is accessible to the computing device and stores program instructions that, when executed by the computing device, cause the computing device to execute the functions specified. The computing device may be a stand-alone general purpose computer, a special purpose computer, or a combination of multiple computing devices connected over a network.

FIG. 1 is a diagram of a portion of an illustrative automated contract management system (100) that can be implemented on a computing device (102). The automated contract management system includes data components related to contracts, their representation and the data structures in which these representations are kept. This example includes two written service contracts: service contract A (105) and service contract B (110). These service contracts describe the terms of a service relationship with a service consumer, and may be created by either the service provider or the service consumer. A formal ontology (115) defining the terms used in the service contracts, such as expiration terms, payment terms, cancellation terms, and other terms is provided with the service contracts. For example, this ontology may include terms such as payment, expiration, service and other terms. The ontology is accompanied with a set of operators that can be associated with terms and are also understood by the system. The ontology (115) can be supplied to the contracting parties in conjunction with the contracts (105, 110). The ontology (115) may also be periodically updated.

Figure 2A:
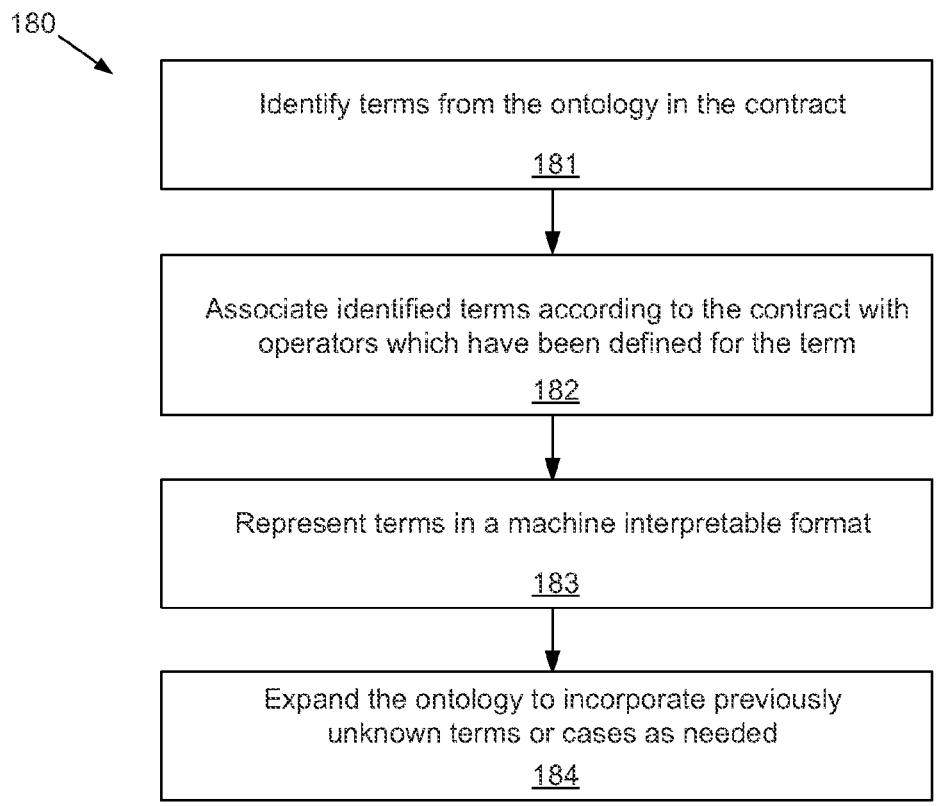
FIG. 2A is a flowchart of an illustrative method for conceptualization of contractual terms that is used to represent the contractual terms in a machine interpretable format, according to one example of principles described herein.

Using the ontology, the term conceptualization and representation (180) can be performed by the computing device (102) to produce machine interpretable terms (120, 130). Term conceptualization and representation involves machine representations of contractual terms that are created using the common ontology of terms and relationships that was previously described. FIG. 2A describes an illustrative method to conceptualize contractual terms and represent them in a machine interpretable format using a common ontology of terms. These machine interpretable terms make up a machine interpretable model of the service contract which is stored in a computer readable memory. In some embodiments, when entering into a contract, this machine interpretable model may also be distributed to the service consumer by a service provider. The machine interpretable model can then be integrated into an automated contract management system.

Cross-contractual relationships (125) can also be identified based on the machine interpretable terms (120, 130). These cross-contractual relationships (125) can show interrelationships and dependencies between the various contracts (105, 110). An illustrative method to combine contractual terms from between related contracts is described below in FIG. 2B and its associated text. According to one example, terms from the first contract (105) and related contract (110) are analyzed to identify cross-contractual relationships (125) between the two contracts.

The information about contractual terms and relationships is represented in the store of machine interpretable contract terms and relationships (135) shown at the bottom of FIG. 1. This contract store (135) allows for formalized contractual service relationships to be brought together for a service consumer. For example, a service consumer may have contracts with service providers A, B and C. The contract store (135) is a data structure that is configured to contain the machine interpretable models of contracts for service providers A, B, and C.

FIG. 2A describes an illustrative method for conceptualization of contractual terms (180) which is used to represent the terms in a machine interpretable format. As discussed above, the starting point for the conceptualization of contractual terms is the agreed upon terms of the contract. These agreed upon terms are typically contained in a written service contract, but may be presented in a variety of different ways. Associated with the contract is an established ontology of contractual terms that can be understood by the system. The illustrative method to conceptualize contractual terms includes identifying terms from the ontology in the contract (block 181). The identified terms are then associated with operators that have been defined for the term (block 182). For example, a first term may be "term(contract_expiration)." For a contract that is specified to expire in 2016 by the written service agreement, the first term may be written as "term (2016)," The term "term(contract_expiration)" is defined in the ontology and associated with one or more operators. For example, an operator "predicate(expires)" is associated with "term(contract_expiration)." Terms from the ontology and associated operators are recognized in the contractual context by the system and can later be reasoned on. After the terms have been conceptualized, they are represented in a machine interpretable format (block 183) and deposited in the contract store. Users are able to expand the ontology to incorporate previously unknown terms or cases as needed (block 184).

Figure 2B:
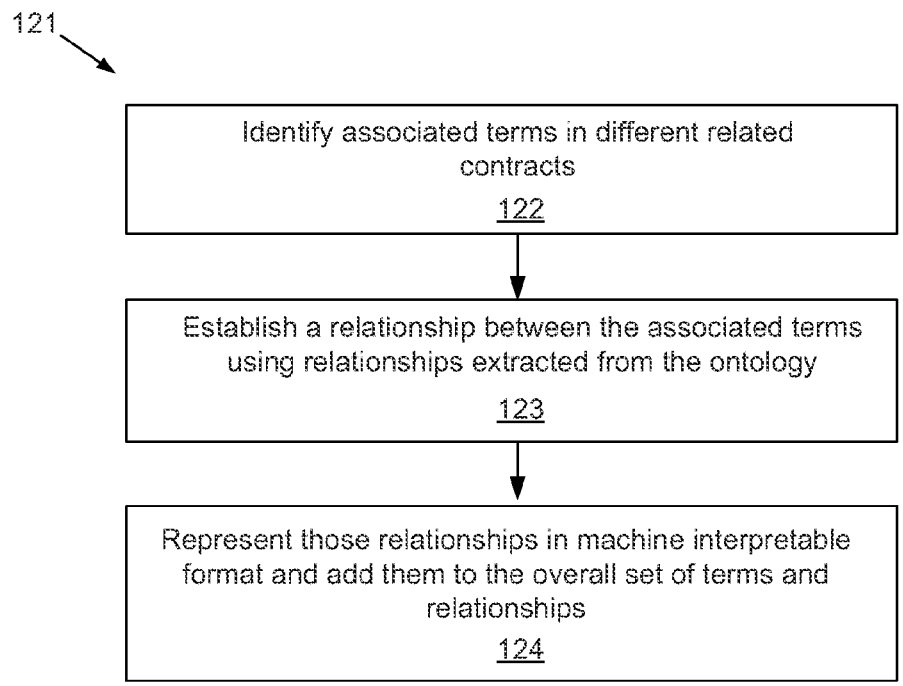
FIG. 2B is a flowchart that describes an illustrative method to combine contractual terms from related contracts, according to one example of principles described herein.

FIG. 2B describes a method (121) for combining contractual terms from separate but related contracts. The illustrative method identifies terms that appear in these related contracts and combines contractual terms from different service providers participating in the same contracted service. As used in the specification, the term "related contracts" is used to describe contract between separate entities with a common third party to provide a combined service.

According to one implementation, this method includes identifying associated terms in related contracts (block 122). For example, identifying terms in a related contract may involve associating identified terms with operators and representing the term in a machine interpretable format for a second related contract. A relationship between terms is established using relationships extracted from the ontology (block 123). In one implementation, a class of terms in the ontology may be used to make correlations between the different related contracts. For example, service provider A's service expires in 2012; provider B's service expires in 2014. Both services are contracted to produce a composite service. The relationship between these two particular terms could be represented in a number of ways. For instance, this cross-contractual relationship may be captured as a "min_expiration" term that defines the earliest contract expiration date of the two related contracts. Thus, at least a portion of the machine interpretable terms (120, 130) may include numeric values and operators that operate on the numeric values and give context to the numeric values. In one example, the cross contractual relationships can be derived from a comparison of common operators and numeric values in machine interpretable terms (120, 130) derived from interrelated contracts (105, 110).

As used in the specification and appended claims, the term "cross-contractual relationship" refers to a relationship between contracts of separate entities that provide a combined service. In a cloud computing environment, shared resources provide storage, processing, data, and software on demand. These resources are typically provided over the internet and are dynamically scalable. Cloud computing involves a wide number of participating entities and relationships between those entities. The cross-contractual relationships may arise from interrelated information technology agreements in a cloud computing environment that are combined to provide a composite service to a user.

In a simple example of cross contractual relationships, a web site host, a web site design firm, a third party fulfillment company, an internet communication company and a search engine optimizer provide a combined service of maintaining an operating website. The website owner may have service contracts with each of these entities, while separate contracting entities typically do not have access to cross-contractual information. Relationships between terms in these contracts, such contract expiration dates, privacy policies, or other protocols are inter-related. For example, a data center may have contracts to supply secured data storage and processing to multiple entities. The information that allows the data center to successfully manage allocation of its resources can be derived from the cross contractual relationships contained in the contracts. In another example, the amount of delay experienced by a customer in placing an order on a website can be dependent on the contractual terms of service with a web site host, internet communication company, and third party fulfillment company. Monitoring these cross-contractual relationships can provide significant advantages in ensuring that the combined service is successfully delivered.

The relationships that are discovered between the various contracts are represented in machine interpretable format and added to the overall set of terms and relationships (block 124). As discussed above, the machine interpretable terms and relationships are collected in the store of machine interpretable contract terms and relationships (135). This contract store (135) can be accessed to evaluate the contract terms and relationships.

Figure 3:
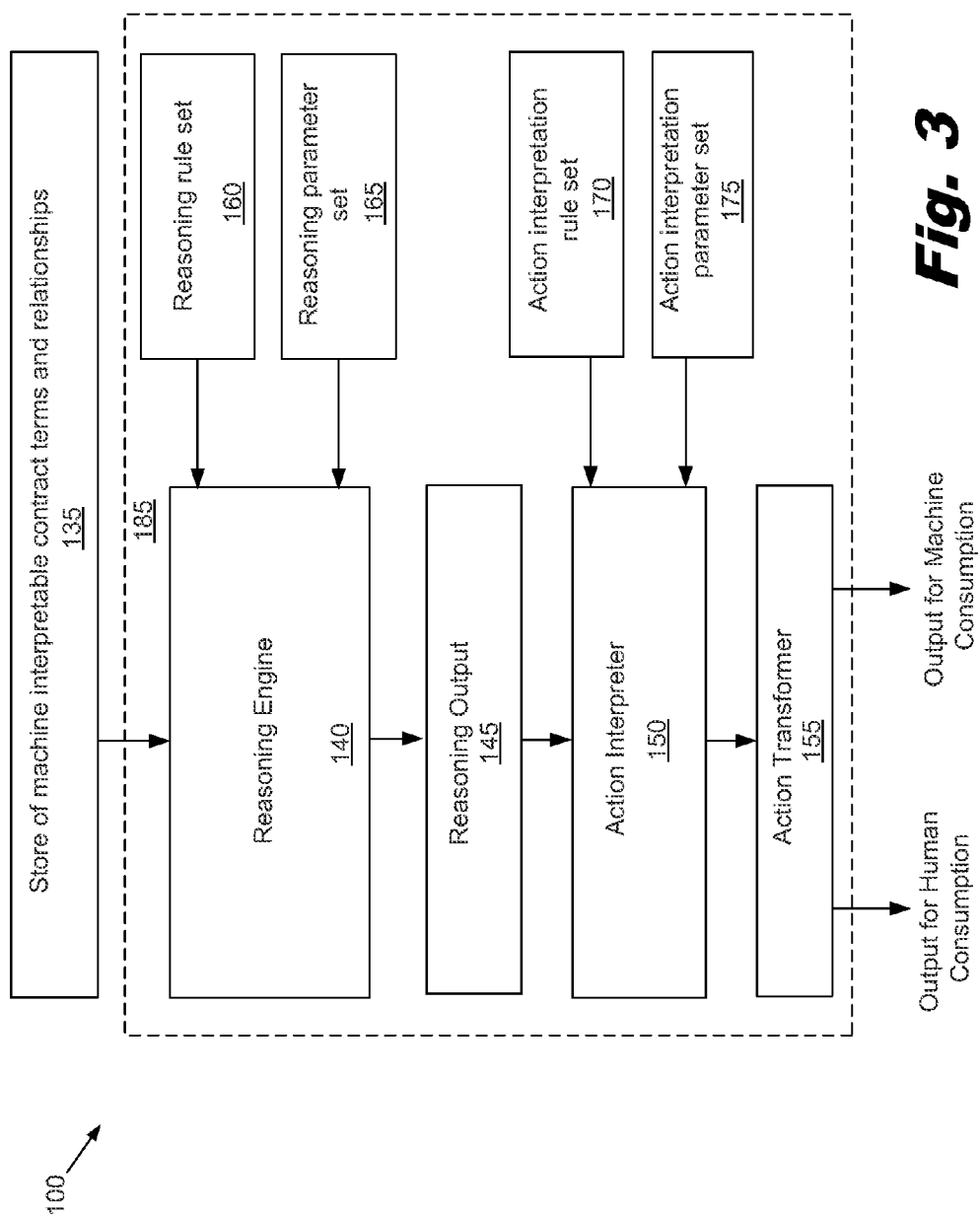
FIG. 3 shows an illustrative system for reasoning on contractual terms and deriving actions, according to one example of principles described herein.

FIG. 3 shows a number of additional components of the automated contract management system (100) that are related to the evaluation of contractual terms. The store of machine interpretable contract terms and relationships (135) is shown at the top of the figure. A reasoning engine (140) accesses the store of machine interpretable contract terms and relationships (135) and combines this information in combination with a reasoning parameter set (165) and a reasoning rule set (160) to evaluate the terms and produces reasoning output (145). The reasoning output (145) represents contradictions, open or pending contractual issues, or unbound relationships between all contractual terms that are represented in the store of machine interpretable contract terms and relationships (135). In one implementation, the reasoning engine (140) may evaluate the combined service contracts to identify conflicts, violation of terms, or to predict upcoming alerts. The reasoning engine (140) may evaluate contract A and determine that it has an upcoming expiration date. This determination can be made in advance of the actual expiration date so that appropriate action can be taken to ensure that the service is continued or replaced. The reasoning engine (140) may periodically or continuously evaluate the combined service contracts in the contract container and generate reasoning output (145).

This reasoning output (145) subsequently can be further interpreted by a software component called action interpreter (150), which accepts the reasoning output and uses action interpretation parameter set (170) and action interpretation rule set (175). Those parameters (170) and rules (175) define which contradictions or unbound relationships from the reasoning output (145) should be interpreted as actions. The actions generated by the action interpreter (150) are passed to a component called action transformer (155) that formats and transforms the actions into a representation that is suitable for either human consumption and/or further machine consumption. In some embodiments, additional software or hardware components accept the output for machine consumption and execute the action.

The automated contract management system (100) may include a number of other components. For example, the system may include a user interface. The user interface may provide the user with access to the contract store, alerts generated by the reasoning engine, a graphical representation of interrelated contract terms, and other aspects of the system.

Figure 4:
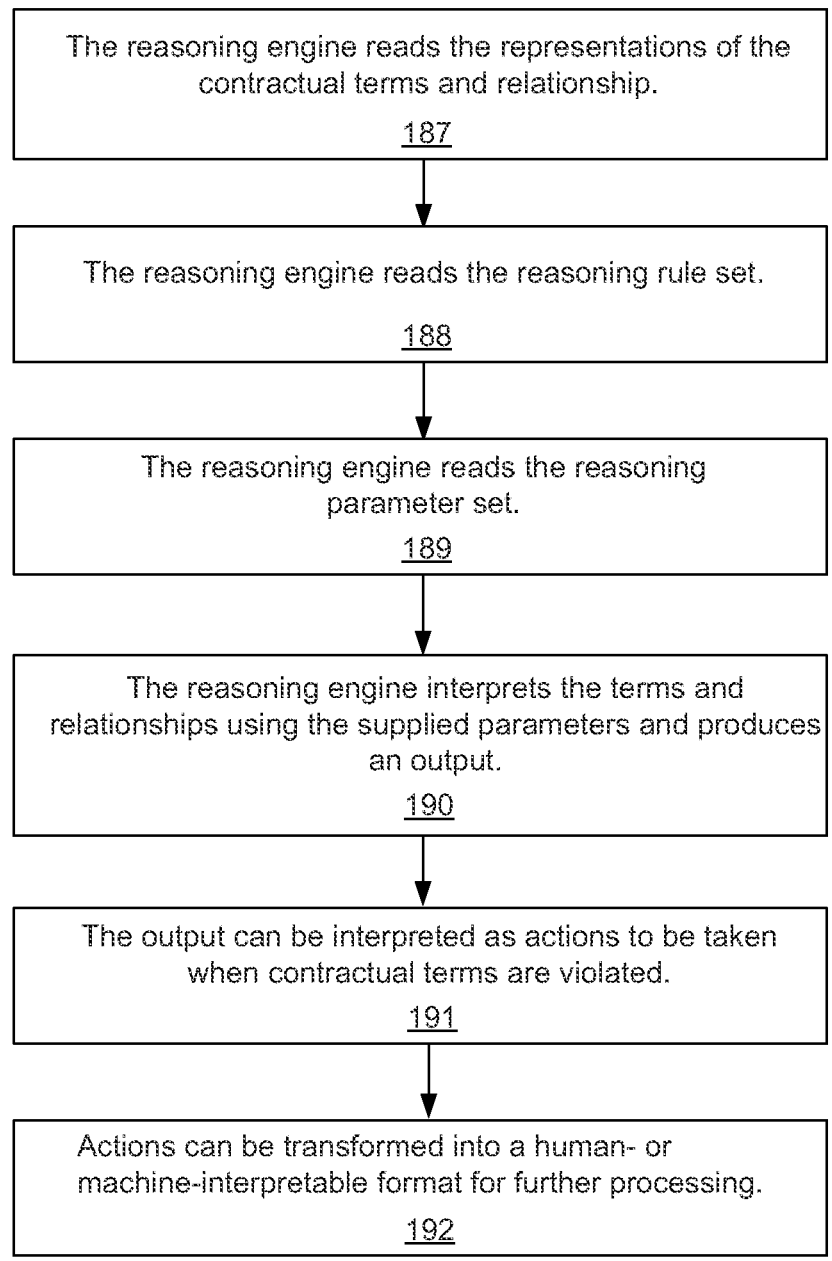
FIG. 4 is a flowchart of an illustrative method for reasoning on contractual terms and deriving actions based on those contractual terms, according to one embodiment of principles described herein.

FIG. 4 is an illustrative method (185) for reasoning on contractual terms and cross-contractual relationships to deriving actions to resolve open and pending contractual issues. As described above with reference to FIG. 3, the system interprets and correlates the formalized contractual terms using a rule set that has been built into the system or can be configured for the system. According to one example of the method, the reasoning engine reads the representations of the contractual terms and relationships (block 187) that have been identified and represented by previously described with respect to FIG. 2A and FIG. 2B. The reasoning engine reads the reasoning rule set (block 188) and reads input parameters that supplement the rule set (block 189). An example of such a parameter is the 'date' for which the rules should be interpreted. The reasoning engine interprets the rules on the representations of the contractual terms and relationships using the supplied parameters and produces output (block 190). The output can be interpreted as actions to be taken when contractual terms are violated, e.g. terms have expired for the supplied evaluation date (block 191). Actions can be transformed into a human- and/or machine interpretable format for further processing (block 192).

The automated contract management system and methods described above has a number of advantages. The system and methods can automatically observe business terms of contractual relationships that have been established between IT service providers and service consumers in an IT outsourcing context. Trusted third party roles can be established to mediate service interactions in a cloud computing environment, for example. Another advantage of the system is that large numbers of contractual terms can be observed and human error reduced or even eliminated. Human effort used to manage the contracts can be reduced and cost of contract management lowered. A further advantage of the system is that contractual terms can be correlated across different service providers. The terms cannot only be observed, but also actions can be derived when terms are violated or do no longer apply. Additionally, the system can maintain complex contractual relationships in a consistent state over large number of contracts. Another advantage of the system is that actions derived from contract violations can be formatted for human consumption or machine-consumption allowing integration into other IT systems. Contractual ontologies for commonly used services and service contracts can be created and maintained to provide both the service providers and service consumers with an up-to-date and comprehensive understanding of the contractual terms. These contractual terms can be formalized to enable the automated validation of service contracts in context.

In conclusion, the automated contract management system provides the automated observance of contracts across a potentially large number of service providers. The system identifies actions when terms are not met or do no longer apply. The system automatically derives actions that are appropriate to resolve open issues in a given contract or interrelated contracts.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A system for automated contract management comprising:
    a computing device; and
    a memory storing program instructions that when executed by the computing device cause the computing device to generate:
    an ontology of terms and cross-contractual relationships used in contracts;
    a conceptualization and representation of the terms of the contracts that are created from the ontology; and
    machine interpretable terms and machine interpretable cross-contractual relationships produced from the conceptualization and the representation of the terms derived from the contracts with reference to the ontology, in which at least a portion of the machine interpretable terms comprises numeric values and operators that operate on the numeric values and give context to the numeric values, wherein the cross contractual relationships are derived from a comparison of the operators and the numeric values in the machine interpretable terms derived from the contracts.

2. The system according to claim 1, further comprising:
    a reasoning rule set;
    a reasoning parameter set; and
    a reasoning engine for accessing a contract store containing the machine interpretable terms and the machine interpretable cross-contractual relationships;
    in which the reasoning engine evaluates the machine interpretable terms and the machine interpretable cross-contractual relationships according to the reasoning rule set and the reasoning parameter set to generate a reasoning output.

3. The system according to claim 2, further comprising:
    an action interpretation rule set;
    an action interpretation parameter set; and
    an action interpreter for accepting the reasoning output and accessing the action interpretation rule set and the action interpretation parameter set.

4. The system of according to claim 3, further comprising an action transformer receiving an output from the action interpreter and producing an output for human consumption and an output for machine consumption.

5. The system according to claim 1, in which the contracts are information technology agreements in a cloud computing environment, the cross contractual relationships arising from interrelated information technology agreements which are combined to provide a composite service to a user.

6. The system according to claim 1, in which the ontology is supplied to contracting parties in conjunction with the contracts.

7. The system according to claim 3, in which the action interpretation parameter set and the action interpretation rule set define contradictions or unbound relationships from the reasoning output that are interpreted by the action interpreter.

8. A method for automated contract management comprising:
    conceptualizing terms in a first contract and a related contract into machine interpretable terms using a computing device, wherein the machine interpretable terms comprise numeric values and operators that operate on the numeric values and give context to the numeric values;
    storing the machine interpretable terms in a computer readable memory accessible to the computing device;
    associating the terms from the first contract and the related contract to identify cross-contractual relationships between the first contract and the related contract by a comparison of the numeric values and the operators in the machine interpretable terms of the first contract and the related contract; and
    reasoning on the contractual machine interpretable terms and the cross-contractual relationships to derive actions to resolve contractual issues.

9. The method of claim 8, in which the conceptualizing the terms in the first contract and the related contract into the machine interpretable format comprises:
    identifying the terms in the first contract and the related contract by referencing an ontology of terms and relationships;
    associating the terms that are identified in the first contract and the related contract with operators which have been defined for the terms;
    representing the terms as the machine interpretable terms;
    depositing the machine interpretable terms in a contract store in the computer readable memory; and
    expanding the ontology to incorporate previously unknown terms or cases.

10. The method of claim 9, in which the associating the terms from the related contract to identify the cross-contractual relationships between the first contract and the related contract comprises:
    identifying associated terms in the first contract and the related contract;
    establishing relationships between the associated terms using information extracted from the ontology;
    representing the cross-contractual relationships in a machine interpretable format; and
    adding the cross-contractual relationships to the terms in the contract store.

11. The method of claim 9, in which the reasoning on the machine interpretable terms and the cross-contractual relationships to derive the actions to resolve the contractual issues comprises:
    reading the terms and the cross-contractual relationships from the contract store using a reasoning engine;
    reading a reasoning rule set and a reasoning parameter set;
    interpreting the terms and the cross-contractual relationships using supplied parameters and producing an output using a reasoning engine;
    interpreting the output as the actions to be taken to resolve the contractual issues that are open or pending using an action interpreter;
    transforming the actions into a machine interpretable format.

12. The method according to claim 11, in which the interpreting the terms and the cross-contractual relationships comprises defining contradictions and unbound relationships using a interpretation parameter set and an action interpretation rule set.

* * * * *